(12) United States Patent
Ben-Itzhak et al.

(10) Patent No.: US 8,521,776 B2
(45) Date of Patent: Aug. 27, 2013

(54) ACCESSING DATA IN A MULTI-GENERATION DATABASE

(75) Inventors: Ori Ben-Itzhak, Kiryat Tivon (IL); Irit Cohen, Atlit (IL); Rivka Mayraz Matosevich, Zichron-Ya'acov (IL)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 12/329,005

(22) Filed: Dec. 5, 2008

(65) Prior Publication Data
US 2010/0145996 A1 Jun. 10, 2010

(51) Int. Cl.
*G06F 17/30* (2006.01)
(52) U.S. Cl.
USPC .......................................... 707/781; 707/695
(58) Field of Classification Search
USPC .............................. 707/695, 783, 781
See application file for complete search history.

(56) References Cited

U.S. PATENT DOCUMENTS

| | | | |
|---|---|---|---|
| 5,043,876 A | 8/1991 | Terry | |
| 5,778,388 A | 7/1998 | Kawamura et al. | |
| 6,351,753 B1 | 2/2002 | Jagadish et al. | |
| 6,684,226 B1 | 1/2004 | Bodilsen | |
| 7,143,120 B2 | 11/2006 | Oks et al. | |
| 7,297,000 B1 | 11/2007 | Bernard | |
| 7,779,039 B2 | 8/2010 | Weissman et al. | |
| 8,121,992 B2 * | 2/2012 | Hanus et al. | 707/695 |

OTHER PUBLICATIONS

Lomet, David et al, "Transaction Time Support Inside a Database Engine", Data Engineering, 2006, CDE '06, Proceedings of the 22nd International Conference on Atlanta, GA, USA, Apr. 3-7, 2006, Piscataway, NJ, USA, IEEE, Apr. 3, 2006, pp. 1-12.
Lomet, David et al, "Recovery from "Bad" User Transactions", ACM, 2 Penn Plaza, Suite 701, New York, NY, USA, 2006, pp. 337-346.
Ozsoyoglu, Gultekin et al, "Temporal and Real-Time Databases: A Survey", IEEE Transactions on Knowledge and Data Engineering, 1995, USA, pp. 513-532.
Russell Sears and Eric Brewer; University of California, Berkeley; "Stasis: Flexible Transactional Storage", to appear in OSDI 2006 SourceURL—http://www.cs.berkeley.edu/~sears/publications/Stasis-OSDI.pdf.
Sanjay Ghemawat; "The Modified Object Buffer: A Storage Management Technique for Object-Oriented Databases", Ph.D. Thesis submitted to MIT. http://publications.csail.mit.edu/lcs/pubs/pdf/MIT-LCS-TR-666.pdf.
Sears et al., "Stasis: Flexible Transactional Storage", OSDI 2006 Paper, pp. 29-44 of the proceedings. http://www.cs.berkeley.edu/~sears/publications/Statis-OSDI.pdf.
Sanjay Ghemawat, "The Modified Object Buffer: A Storage Management Technique for Object-Oriented Databases", Ph.D Thesis submitted to MIT, Sep. 1995. http://publications.csail.mit.edu/lcs/pubs/pdf/MIT-LCS-TR-666.pdf.

* cited by examiner

*Primary Examiner* — Huawen Peng
(74) *Attorney, Agent, or Firm* — Century IP Group; Suzanne Erez

(57) ABSTRACT

A method for accessing data in a multi-generation database is provided. The method comprises receiving a request to access first data in the database, wherein the first data is located on a first page of the database; reading an entry corresponding to the first page to locate a first track on the first page to access a newest version of the data; acquiring a first lock to synchronize accesses to the first track; and determining that the first track stores the newest version of the data, in response to reading the entry while holding the first lock.

18 Claims, 8 Drawing Sheets

ACCESSING DATA IN A MULTI-GENERATION DATABASE

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to databases and, more particularly, to accessing data in a multi-generation database.

BACKGROUND

A database refers to an organized collection of data stored in a data storage system managed by a database management system (DBMS). The DBMS usually implements some type of synchronization to allow concurrent accesses to data in the database.

Synchronization may involve implementing a lock for each data in a database. If the locks are stored in high-speed memory, however, there may be scalability problems depending on the size of the database since high-speed memory tends to be small. On the other hand, storing the locks in a dedicated location in slow-access memory negatively impacts performance.

In a multi-generation database, data is organized according to one or more generations, or periods of time. One generation may end and another generation may begin at a checkpoint, at a restoration point, at the start of a particular operation, or at some other designated point in time.

Typically, there are multiple versions of each data, one for each generation. Each version is associated with a generation such that the newest version may be identified by searching for the version associated with the most current generation. Unfortunately, searching all the versions for the version with the most current generation is inefficient and makes synchronization difficult.

Systems and methods are needed to overcome the above-mentioned shortcomings.

SUMMARY

The present disclosure is directed to systems and corresponding methods that facilitate accessing data in a multi-generation database.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for accessing data in a multi-generation database is provided. The method comprises receiving a request to access first data in the database, wherein the first data is located on a first page of the database; reading an entry corresponding to the first page to locate a first track on the first page to access a newest version of the data; acquiring a first lock to synchronize accesses to the first track; and determining that the first track stores the newest version of the data, in response to reading the entry while holding the first lock.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
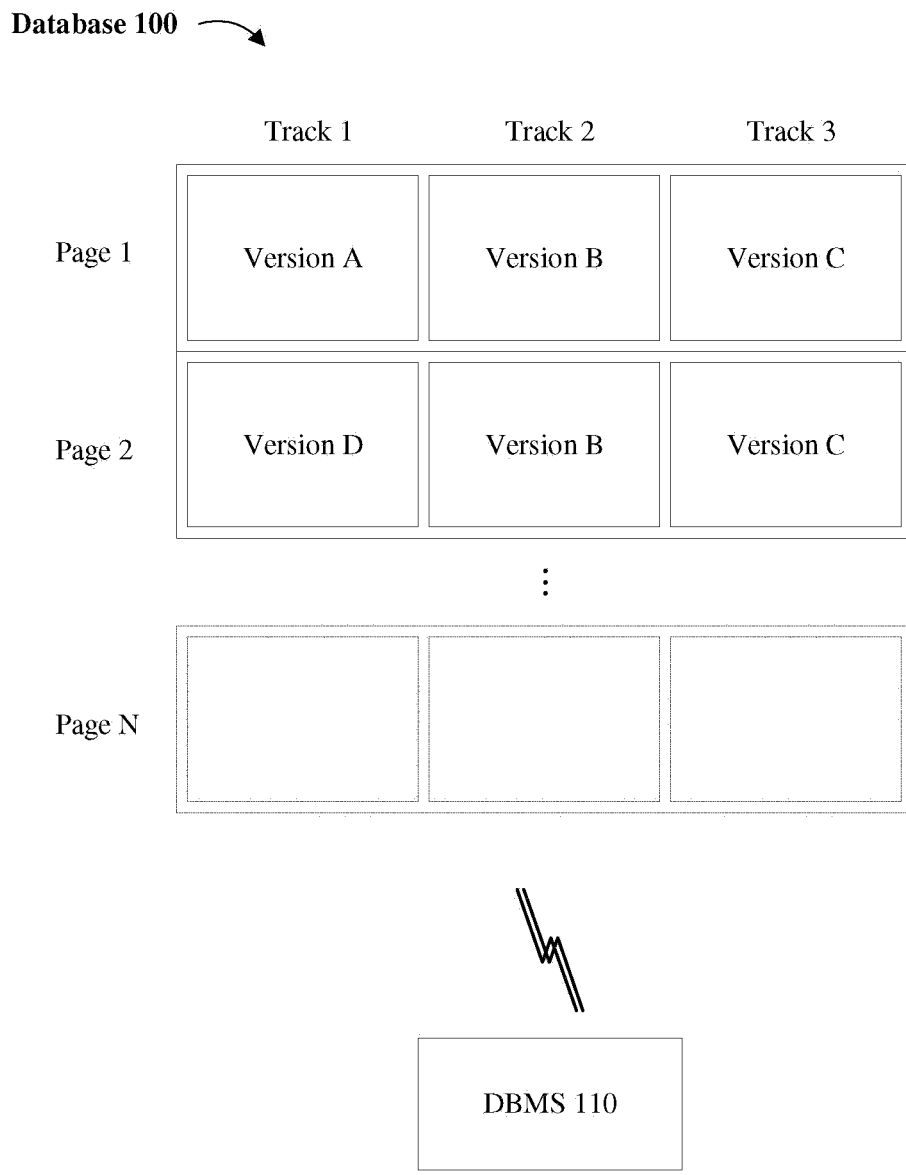
FIG. 1 illustrates an exemplary database layout for a multi-generation database, in accordance with one or more embodiments.

Referring to FIG. 1, in accordance with one embodiment, an exemplary multi-generation database 100 comprises one or more pages corresponding to data stored in the database 100. The database 100 may, for example, comprise N data such that there are N pages, one for each data. Each page of data comprises one or more versions of the data, wherein each version of the data is located on a different track, or location, on the page. For example, page 1 may comprise versions A, B, and C located on tracks 1, 2, and 3, respectively; and page 2 may comprise versions D, B, and C located on tracks 1, 2, and 3, respectively.

The database 100 is managed by a DBMS 110. In particular, the DBMS 110 manages access to data in the database 100. To do so, the DBMS 110 may synchronize access to data by implementing a lock for each track of each page in the database 100. For read accesses, the lock may be shared by more than one access. For write accesses, the lock is exclusive to one access. Desirably, the lock is stored on the track with the data so that one access is sufficient to access both the lock and the version of the data on the track, improving performance and providing scalability for large databases. In one embodiment, locks on the same page may be collectively treated as a single lock.

Figure 2:
FIG. 2 illustrates an exemplary page table to identify the newest version of data, in accordance with one embodiment.

The DBMS 110 may also maintain a page table to locate the newest version of data on a page. Maintaining the page table improves performance and simplifies synchronization by removing the need to search each version of the data to find the newest version. Referring to FIGS. 1 and 2, in accordance with one embodiment, an exemplary page table 200 comprises one or more entries corresponding to one or more pages of the database 100. For example, the page table 200 may comprise N entries corresponding to N pages of the database 100. Each of the entries refers to the track of the newest version of the data stored on the page associated with the entry.

Depending on implementation, different formats may be used to refer to a track. Desirably, a minimal number of bits are used to provide scalability for large databases. For example, approximately $\log_2 (N)$ bits may be used to refer to a track if there are N tracks on a page. In the exemplary illustration in FIG. 1, the newest version of the data on page 1, version C, is located on track 3; and the newest version of the data on page 2, version D, is located on track 1. Since there are 3 tracks on a page, two bits are used to refer to a track. "00" is used to refer to track 1, "01" is used to refer to track 2, and "10" is used to refer to track 3, for example.

Figure 3:
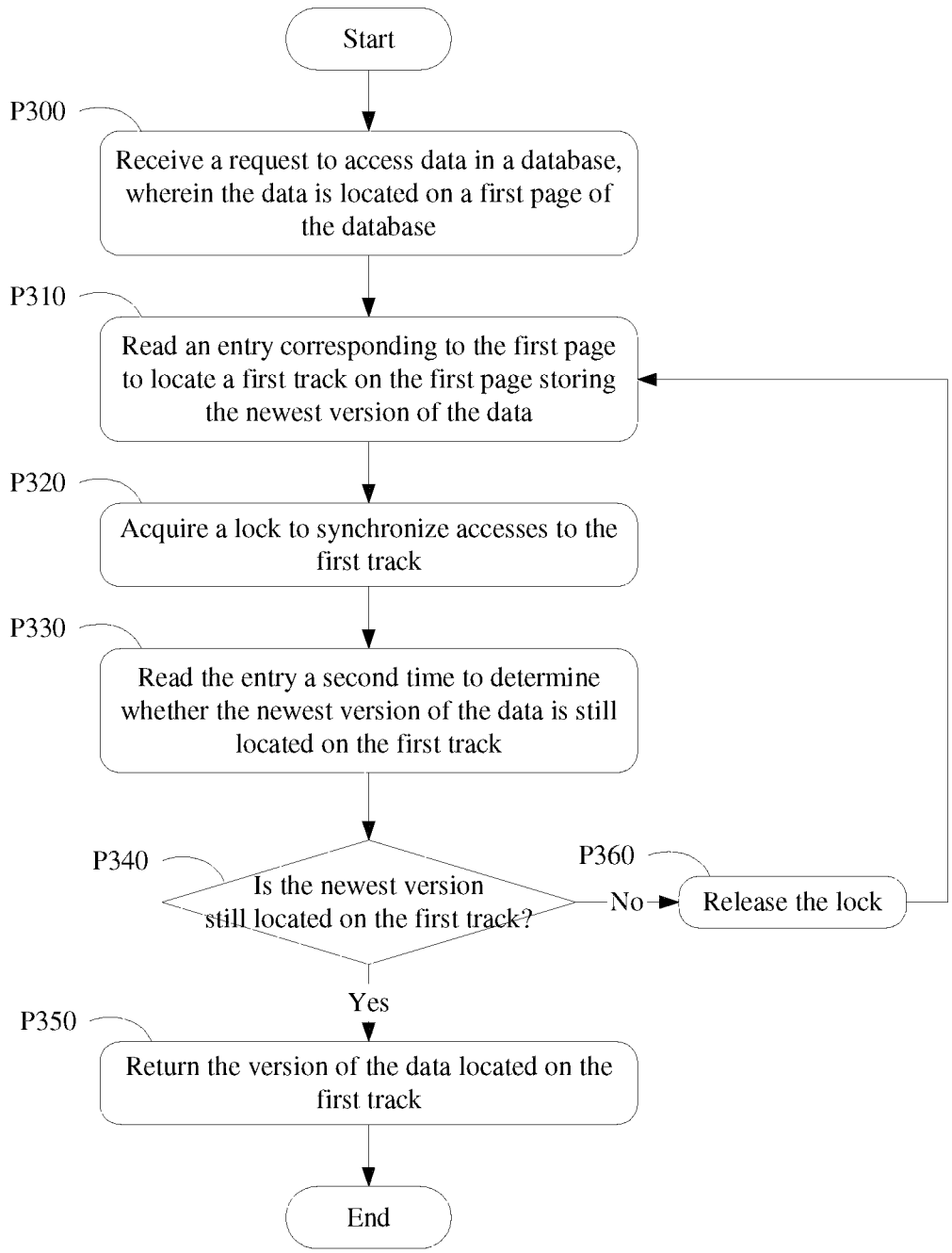
FIG. 3 is a flow diagram of a method for reading data from a multi-generation database, in accordance with one embodiment.

Referring to FIGS. 1 and 3, in accordance with one embodiment, the DBMS 110 receives a request to access data located on a first page of the database 100 (P300). In response, the DBMS 110 reads an entry corresponding to the first page from page table 200 to locate a first track on the first page storing the newest version of the data (P310). For example, if the DBMS 110 receives a request to access data from page 1 of the database 100, the DBMS 110 reads entry 1 from page table 200. In FIGS. 1 and 2, entry 1 refers to track 3 storing version C of the data.

Upon locating the first track (i.e., the track designated by the corresponding entry in the page table), the DBMS 110 acquires a lock to synchronize accesses to the first track (P320). The lock synchronizes accesses to the data such that the newest version of the data is located on the first track as long as the entry refers to the first track while the lock to the track is held. Once the lock to the first track is acquired, the corresponding entry in the page table is read a second time to determine whether the newest version of the data is still located on the first track (P330).

In other words, the entry in the page table may change between the first reading and the second reading of the corresponding entry in the page table, if the first page comprising the data is advanced to a new generation after the first reading, but before acquiring the lock to the first track pointed to by the corresponding entry in the page table. Further details on advancing the page are provided below with reference to FIG. 6. If the newest version of the data is still located on the first track (P340), the DBMS returns the version of the data located on the first rack (P350). If the newest version of the data is no longer located on the first track (P340), the DBMS 110 releases the lock (P360) and repeats P310 through P360.

Figure 4:
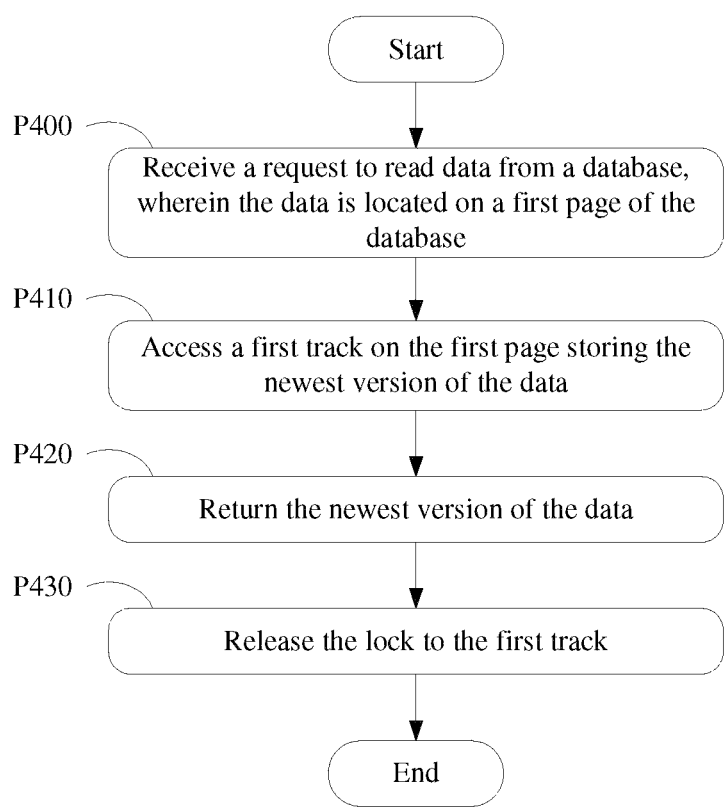
FIG. 4 is a flow diagram of an exemplary method for identifying the newest version of data, in accordance with one embodiment.

Referring to FIGS. 1, 3, and 4, in accordance with one embodiment, the DBMS 110 receives a request to read data located on a first page of the database 100 (P400). Upon receiving the request, the DBMS 110 accesses a first track on the first page storing the newest version of the data (P410, P300-350) and returns the newest version of the data (P420). The DBMS 110 also releases the lock to the first track that was acquired during P410 (P430).

Figure 5:
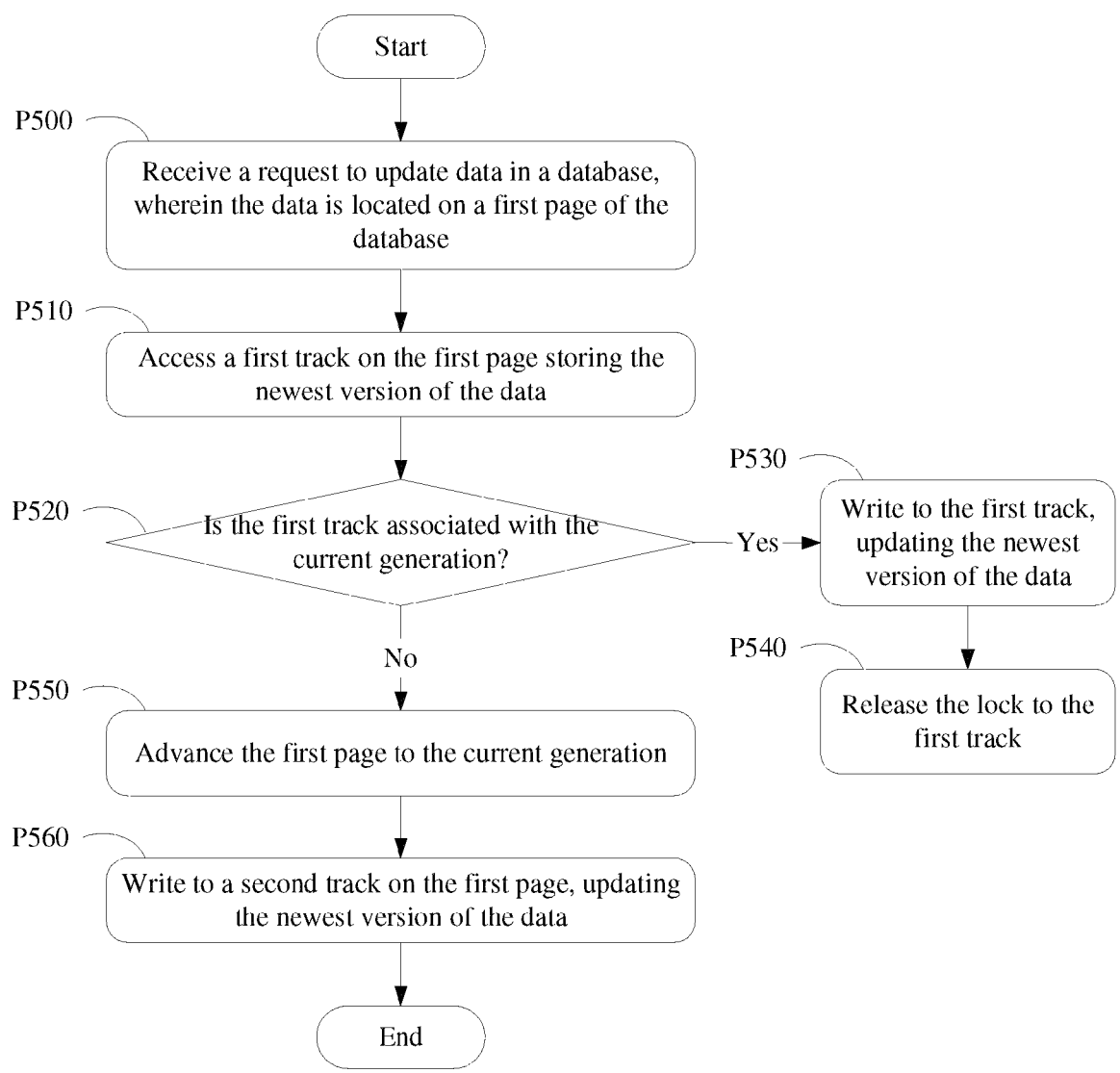
FIG. 5 is a flow diagram of a method for writing data to a multi-generation database, in accordance with one embodiment.

Referring to FIGS. 1, 3, and 5, in accordance with one embodiment, the DBMS 110 receives a request to update data located on a first page of the database 100. Upon receiving the request, the DBMS 110 accesses a first track on the first page storing the newest version of the data (P500, P300-350) and determines whether the first track is associated with the current generation (P520). The DBMS 110 may identify the current generation, for example, by checking recent transactions in a transaction log maintained by the DBMS 110.

If the first track is associated with the current generation (P520), the DBMS 110 writes to the first track, updating the newest version of the data (P530), and then releases the lock to the first track (P540), which was exclusively acquired during P500. Otherwise, the DBMS 110 advances the first page to the current generation (P550) and writes to a second track on the first page, updating the newest version of the data (P560). Advancing the first page, which includes creating a new version of the data on the second track and updating the page table 200, is done atomically from a user perspective.

Figure 6:
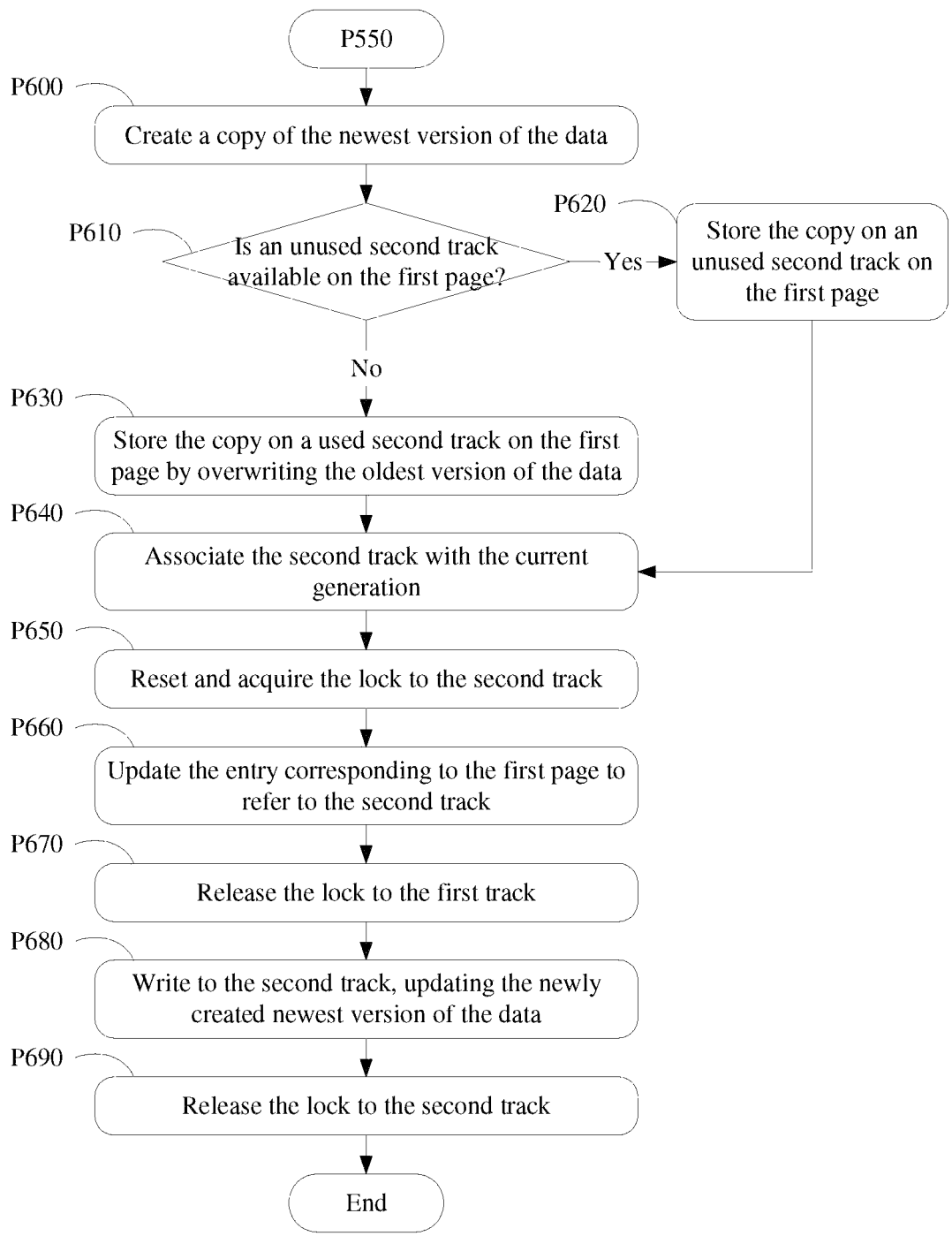
FIG. 6 is a flow diagram of a method for advancing a page in a multi-generation database, in accordance with one embodiment.

Referring to FIGS. 1, 5, and 6, in accordance with one embodiment, the DBMS 110 creates a copy of the newest version of the data (P600). If an unused second track is available on the first page (P610), the DBMS 110 stores the copy on the unused second track (P620). Otherwise, the DBMS 110 stores the copy on a used second track by overwriting the oldest version of the data (P630). In one embodiment, the oldest version of the data is located on the track to the right of the newest version of the data. For example, in FIG. 1 on page 2, version B the oldest version is to the right of version D the newest version (due to overlap). As another example, in FIG. 1 on page 1, version C is the newest version of the data on page 1, and the oldest version of the data is version A, located on track 1 (with no overlap).

Once the newest version of the data is copied to the second track, the second track is associated with the current generation (P640), and the lock synchronizing accesses to the second track is reset and exclusively acquired (P650). Thus, the copy of the newest version of the data stored on the second track becomes the newest version of the data.

Referring back to FIGS. 1, 5, and 6, on acquiring the lock to the second track, the DBMS 110 updates the entry for the page in page table 200 (P660) and releases the lock to the first track that was exclusively acquired during P500 (P670). Once the entry is updated, the DBMS 110 writes to the second track, updating the newly created newest version of the data (P680, P560) and releases the lock to the second track (P690).

For example, if page 1 is advanced, page 1 of FIG. 1 and entry 1 of FIG. 2 become like page 2 of FIG. 1 and entry 2 of FIG. 2.

In different embodiments, the invention may be implemented either entirely in the form of hardware or entirely in the form of software, or a combination of both hardware and software elements. For example, database 100 and DBMS 110 may be included in a controlled computing system environment that can be presented largely in terms of hardware components and software code executed to perform processes that achieve the results contemplated by the system of the present invention.

Figure 7:
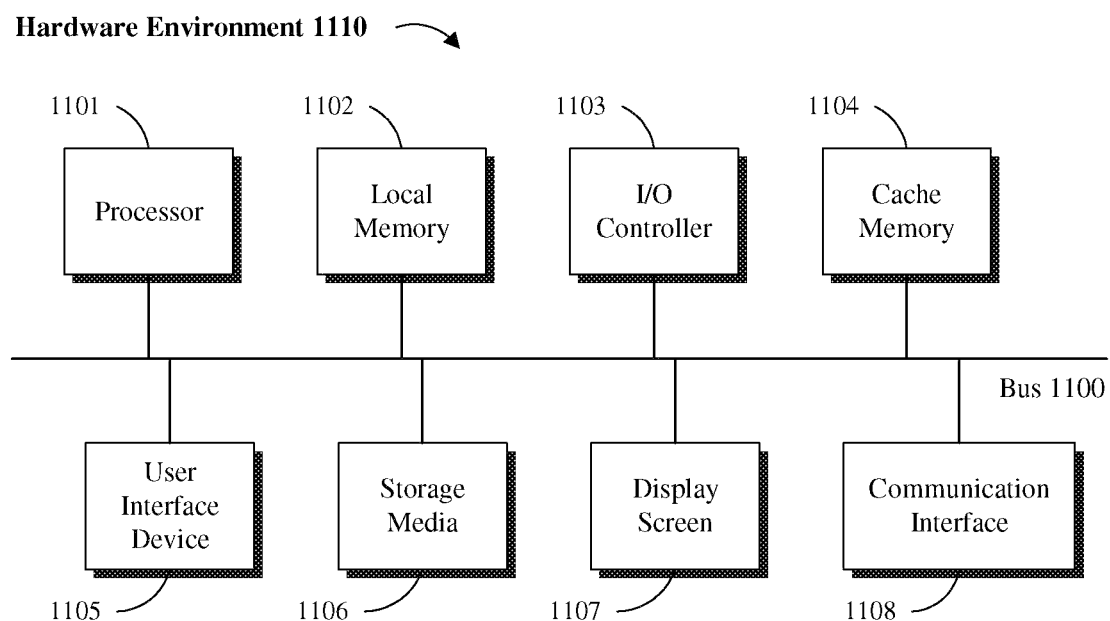
FIGS. 7 and 8 are block diagrams of hardware and software environments in which a system of the present invention may operate, in accordance with one or more embodiments.
Figure 8:
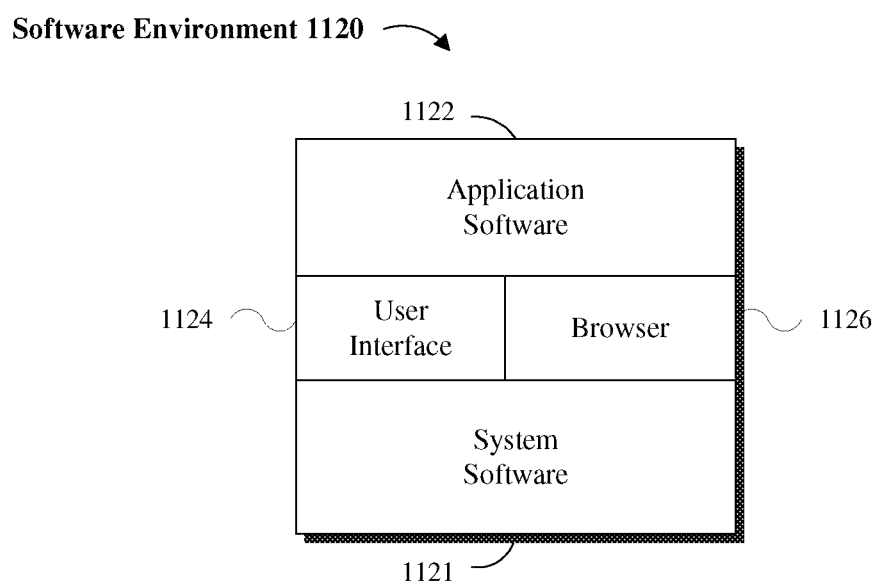

Referring to FIGS. 7 and 8, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In one embodiment, DBMS 110 is implemented as application software 1122 executed on one or more hardware environments to manage access to the database 100. Application software 1122 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 7, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage medial 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 8, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a general computing system and server software is executed on a server system.

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The present invention has been described above with reference to one or more features or embodiments. Those skilled in the art will recognize, however, that changes and modifications may be made to these embodiments without departing from the scope of the present invention. These and various other adaptations and combinations of the embodiments disclosed are within the scope of the invention and are further defined by the claims and their full scope of equivalents.

What is claimed is:

1. A method for accessing data, the method comprising:
receiving a request to access first data in a database having one or more pages, each page having one or more tracks, wherein the first data is located on a first page of the database, and wherein the first page comprises multiple versions of the first data respectively stored at multiple tracks on the first page,
wherein the newest version of the first data stored in a first track on the first page is identifiable based on a value stored in a first entry in a data structure having one or more entries, said one or more entries being respectively associated with said one or more pages in the database;
wherein said first entry in the data structure is associated with the first page in the database and the value of said first entry identifies the location of the first track on the first page in the database, where the newest version of the first data on the first page is located, wherein the value of the first entry is not associated with a time when the newest version of the first data was stored in the first track;
reading from the data structure the value stored in the first entry to locate a track on the first page on which the newest version of the data is stored;
acquiring a first lock on the first track identified based on the value read from the first entry as containing the first data, in order to synchronize access to the first data;
verifying that the first track stores the newest version of the first data, since the value stored in the first entry was read, by reading the value stored in the first entry once more, prior to reading or updating the first data stored in the first track,
advancing the first page to the current generation;
writing to a second track on the first page to update the newest version of the data;
releasing a second lock synchronizing accesses to the second track; and
creating a copy of the newest version of the data on the second track.

2. The method of claim 1, wherein the request is to read the first data, further comprising:
returning the newest version of the data; and
releasing the first lock.

3. The method of claim 1, wherein the request is to update the first data, further comprising determining whether the first track is associated with a current generation of the database.

4. The method of claim 3, wherein the first track is associated with the current generation of the database, further comprising:
writing to the first track to update the newest version of the data; and
releasing the first lock.

5. The method of claim 1, further comprising:
associating the second track with the current generation;
resetting and acquiring the second lock to synchronize accesses to the second track;
updating the entry corresponding to the first page to refer to the second track, wherein the copy becomes the newest version of the data; and
releasing the first lock.

6. The method of claim 5, wherein creating the copy comprises overwriting an oldest version of the data stored on the second track.

7. A system for accessing data in a database, the system comprising:
one or more processors;
a logic unit for receiving a request to access first data in a database having one or more pages, each page having one or more tracks, wherein the first data is located on a first page of the database, and wherein the first page comprises multiple versions of the first data respectively stored at multiple tracks on the first page,
wherein the newest version of the first data on the first page is identifiable based on a value stored in a first entry in a data structure having one or more entries, said one or more entries being respectively associated with said one or more pages in the database;
wherein said first entry in the data structure is associated with the first page in the database and the value of said first entry identifies the location of the first track on the first page in the database, where the newest version of the first data on the first page is located, wherein the value of the first entry is not associated with a time when the newest version of the first data was stored in the first track;
a logic unit for reading from the data structure the value stored in the first entry to locate a track on the first page on which the newest version of the data is stored;
a logic unit for acquiring a first lock on the first track identified based on the value read from the first entry as containing the first data, in order to synchronize access to the first data;
a logic unit for verifying that the first track stores the newest version of the first data, since the value stored in the first entry was read, by reading the value stored in the first entry once more, prior to reading or updating the first data stored in the first track,
a logic init for advancing the first page to the current generation;
a logic unit for writing to a second track on the first page to update the newest version of the data;
a logic unit for releasing a second lock synchronizing accesses to the second track; and
a logic unit for creating a copy of the newest version of the data on the second track.

8. The system of claim 7, wherein the request is to read the first data, further comprising:
a logic unit for returning the newest version of the data; and
a logic unit for releasing the first lock.

9. The system of claim 7, wherein the request is to update the first data, further comprising a logic unit for determining whether the first track is associated with a current generation of the database.

10. The system of claim 9, wherein the first track is associated with the current generation of the database, further comprising:
a logic unit for writing to the first track to update the newest version of the data; and
a logic unit for releasing the first lock.

11. The system of claim 7, further comprising:
logic unit for associating the second track with the current generation;
a logic unit for resetting and acquiring the second lock to synchronize accesses to the second track;
a logic unit for updating the entry corresponding to the first page to refer to the second track, wherein the copy becomes the newest version of the data; and
a logic unit for releasing the first lock.

12. The system of claim 11, wherein the logic unit for creating the copy of the newest version of the data on the second track comprises a logic unit for overwriting an oldest version of the data stored on the second track.

13. A computer program product comprising a non-transitory computer readable medium having logic code stored thereon, wherein the logic code when executed on a computer causes the computer to:

receive a request to access first data in a database having one or more pages, each page having one or more tracks, wherein the first data is located on a first page of the database, and wherein the first page comprises multiple versions of the first data respectively stored at multiple tracks on the first page, wherein the newest version of the first data on the first page is identifiable based on a value stored in a first entry in a data structure having one or more entries, said one or more entries being respectively associated with said one or more pages in the database;

wherein said first entry in the data structure is associated with the first page in the database and the value of said first entry identifies the location of the first track on the first page in the database, where the newest version of the first data on the first page is located, wherein the value of the first entry is not associated with a time when the newest version of the first data was stored in the first track;

read from the data structure the value stored in the first entry to locate a track on the first page on which the newest version of the data is stored;

acquire a first lock on the first track identified based on the value read from the first entry as containing the first data, in order to synchronize access to the first data; and verify that the first track stores the newest version of the first data, since the value stored in the first entry was read, by reading the value stored in the first entry once more, prior to reading or updating the first data stored in the first track;

advance the first page to the current generation;

write to a second track on the first page to update the newest version of the data;

release a second lock synchronizing accesses to the second track; and create a copy of the newest version of the data on the second track.

14. The computer program product of claim 13, wherein the request is to read the first data and wherein the logic code when executed on a computer further causes the computer to:

return the newest version of the data; and release the first lock.

15. The computer program product of claim 13, wherein the request is to update the first data and wherein the logic code when executed on a computer further causes the computer to determine whether the first track is associated with a current generation of the database.

16. The computer program product of claim 15, wherein the first track is associated with the current generation of the database and wherein the logic code when executed on a computer further causes the computer to:

write to the first track to update the newest version of the data; and release the first lock.

17. The computer program product of claim 15, wherein the first track is not associated with the current generation of the database and wherein the logic code when executed on a computer further causes the computer to:

advance the first page to the current generation;

write to a second track on the first page to update the newest version of the data; and release a second lock synchronizing accesses to the second track.

18. The computer program product of claim 13, wherein the logic code when executed on a computer further causes the computer to:

associate the second track with the current generation;

reset and acquiring the second lock to synchronize accesses to the second track;

update the entry corresponding to the first page to refer to the second track, wherein the copy becomes the newest version of the data; and release the first lock.

* * * * *